United States Patent
Ueno

(10) Patent No.: US 8,825,268 B2
(45) Date of Patent: Sep. 2, 2014

(54) SHIFT SWITCHING DEVICE

(75) Inventor: Koki Ueno, Aichi-ken (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 53 days.

(21) Appl. No.: 13/609,617

(22) Filed: Sep. 11, 2012

(65) Prior Publication Data

US 2013/0000436 A1 Jan. 3, 2013

Related U.S. Application Data

(62) Division of application No. 12/601,400, filed as application No. PCT/JP2008/059965 on May 23, 2008, now Pat. No. 8,335,619.

(30) Foreign Application Priority Data

May 25, 2007 (JP) .................................. 2007-139322

(51) Int. Cl.
*F16H 61/12* (2010.01)
*F16H 59/10* (2006.01)
*F16H 63/48* (2006.01)

(52) U.S. Cl.
CPC ............. *F16H 59/105* (2013.01); *F16H 61/12* (2013.01); *F16H 2061/1272* (2013.01); *F16H 63/48* (2013.01); *F16H 2061/1284* (2013.01); *F16H 2061/1232* (2013.01); *F16H 2061/1268* (2013.01)
USPC ................................ 701/29.2; 477/63; 477/64

(58) Field of Classification Search
None
See application file for complete search history.

(56) References Cited

U.S. PATENT DOCUMENTS

| | | |
|---|---|---|
| 5,591,101 A | 1/1997 | Sakakiyama et al. |
| 5,827,150 A | 10/1998 | Mukumoto |
| 5,855,532 A | 1/1999 | Sugiyama |
| 5,897,601 A | 4/1999 | Suzuki |
| 6,030,316 A | 2/2000 | Kadota |
| 6,047,679 A | 4/2000 | Matsumoto et al. |
| 6,561,950 B1 | 5/2003 | Ohtsuka |
| 6,655,343 B2 | 12/2003 | Suzuki et al. |
| 6,659,911 B2 | 12/2003 | Suzuki et al. |
| 6,779,508 B2 | 8/2004 | Fuwa |
| 6,939,266 B2 | 9/2005 | Koerner et al. |

(Continued)

FOREIGN PATENT DOCUMENTS

| | | |
|---|---|---|
| JP | 61-157441 A | 7/1986 |
| JP | 05-223162 A | 8/1993 |

(Continued)

OTHER PUBLICATIONS

Final Office Action issued on Sep. 19, 2013 for U.S. Appl. No. 13/124,981.

(Continued)

*Primary Examiner* — John R Olszewski
*Assistant Examiner* — Jess Whittington
(74) *Attorney, Agent, or Firm* — Sughrue Mion, PLLC

(57) ABSTRACT

An HV-ECU executes a program including a step (S102) of turning on a fail-safe permission flag if a select sensor is abnormal (YES in step S100), and a step (S108) of transmitting a non-P request signal to a P-ECU if the position of a shift lever is read as the N position (YES in S104) and a predetermined time Tn(2) elapses (YES in S106).

2 Claims, 12 Drawing Sheets

(56) References Cited

U.S. PATENT DOCUMENTS

| | | |
|---|---|---|
| 7,367,854 B2 | 5/2008 | Arvidsson |
| 7,426,854 B2 | 9/2008 | Endo et al. |
| 7,563,197 B2 | 7/2009 | Ayabe et al. |
| 7,625,313 B2 | 12/2009 | Kondo et al. |
| 8,032,274 B2 | 10/2011 | Niwa et al. |
| 8,335,619 B2 | 12/2012 | Ueno |
| 2001/0045138 A1* | 11/2001 | Ohashi et al. ............... 74/336 R |
| 2002/0065169 A1 | 5/2002 | Suzuki et al. |
| 2003/0105572 A1 | 6/2003 | Joe et al. |
| 2003/0176258 A1 | 9/2003 | Ohtsuka |
| 2004/0035391 A1 | 2/2004 | Fuwa |
| 2004/0053743 A1 | 3/2004 | Tsuzuki et al. |
| 2004/0162661 A1 | 8/2004 | Kikuchi |
| 2004/0186646 A1 | 9/2004 | Kuwata et al. |
| 2004/0226801 A1 | 11/2004 | De Jonge et al. |
| 2004/0259685 A1 | 12/2004 | Inoue et al. |
| 2005/0030009 A1 | 2/2005 | Moreno |
| 2006/0258503 A1 | 11/2006 | Inoue et al. |
| 2007/0087896 A1 | 4/2007 | Matsuzaki et al. |
| 2007/0129214 A1 | 6/2007 | Kondo et al. |
| 2007/0137337 A1* | 6/2007 | Kim ............................... 74/335 |
| 2008/0113848 A1 | 5/2008 | Inouse et al. |
| 2009/0150075 A1 | 6/2009 | Watanabe et al. |
| 2009/0157251 A1 | 6/2009 | Niwa et al. |
| 2010/0082209 A1 | 4/2010 | Yoshioka et al. |
| 2010/0168956 A1 | 7/2010 | Ueno |
| 2011/0010064 A1 | 1/2011 | Funakoshi et al. |
| 2011/0125356 A1 | 5/2011 | Takahashi |
| 2011/0202231 A1 | 8/2011 | Ueno et al. |
| 2012/0022756 A1 | 1/2012 | Ueno et al. |
| 2012/0232756 A1 | 9/2012 | Yuan et al. |
| 2013/0000436 A1 | 1/2013 | Ueno |

FOREIGN PATENT DOCUMENTS

| | | |
|---|---|---|
| JP | 08-303287 A | 11/1996 |
| JP | 09-152902 A | 6/1997 |
| JP | 11-245679 A | 9/1999 |
| JP | 2000-145493 A | 5/2000 |
| JP | 2001-294056 A | 10/2001 |
| JP | 2001-304390 A | 10/2001 |
| JP | 2002-048234 A | 2/2002 |
| JP | 2002-213600 A | 7/2002 |
| JP | 2003-065436 A | 3/2003 |
| JP | 2003-072417 A | 3/2003 |
| JP | 2003-139227 A | 5/2003 |
| JP | 2004-251309 A | 9/2004 |
| JP | 2004-293441 A | 10/2004 |
| JP | 2005-007993 A | 1/2005 |
| JP | 2006-162050 A | 6/2006 |
| JP | 2006-336717 A | 12/2006 |
| JP | 2006-349016 A | 12/2006 |
| JP | 2007-009946 A | 1/2007 |
| JP | 2007-062664 A | 3/2007 |
| JP | 2007-192338 A | 8/2007 |
| JP | 2008-290622 A | 12/2008 |
| JP | 2009-139227 A | 6/2009 |

OTHER PUBLICATIONS

Notice of Allowance issued in U.S. Appl. No. 12/601,400 dated Sep. 24, 2012.

Office Action mailed Feb. 28, 2012 in U.S. Appl. No. 12/601,400.

Office Action mailed Jan. 11, 2013 in U.S. Appl. No. 13/124,981.

Office Action mailed Mar. 5, 2013 in U.S. Appl. No. 13/260,401.

European Search Report issued Jun. 6, 2011 for European Application No. 08825862.9.

Japanese Office Action issued Oct. 18, 2011 for counterpart Japanese Application No. 2007-139322.

U.S. Appl. No. 12/601,400, filed Nov. 23, 2009, Koki Ueno.

U.S. Appl. No. 13/124,981, filed Apr. 19, 2011, Koki Ueno et al.

U.S. Appl. No. 13/260,401, filed Sep. 26, 2011, Koki Ueno et al.

* cited by examiner

| SHIFT POSITION MANIPULATED BY USER | M | N | R | D | B |
|---|---|---|---|---|---|
| FAIL-SAFE PROCESSING WHEN SELECT SENSOR IS ABNORMAL | M | M | N | N | N |

FIG. 14

| ECU RECOGNITION POSITION | | M | N | R | D | B | (M') |
|---|---|---|---|---|---|---|---|
| ACTUAL SHIFT POSITION (MANIPULATED BY USER) | | M | N or M | R | D or B | D or B | R |
| SHIFT RANGE WHEN ABNORMALITY OCCURS | PATTERN (A) | — | — | — | — | — | N |
| | PATTERN (B) | — | — | — | N | N | — |
| | PATTERN (C) | — | — | N | — | — | — |
| | PATTERN (D) | — | — | N | N | N | N |
| | PATTERN (E) | — | — | N | N | N | — |

— : SHIFT POSITION IS NOT CHANGED

SHIFT SWITCHING DEVICE

This is a divisional of application Ser. No. 12/601,400 filed Nov. 23, 2009, which is a National Stage of International Application No.: PCT/JP2008/059965 filed May 23, 2008, the contents of all of which are incorporated herein by reference in their entirety.

TECHNICAL FIELD

The present invention relates to control of a shift switching mechanism, and in particular to control of releasing a parking lock according to the intention of a driver even in the event of an abnormality in a sensor detecting the position of a shift lever.

BACKGROUND ART

Conventionally, as shift switching mechanisms switching a shift position of an automatic transmission by an actuator according to manipulation of a shift lever by a driver, those equipped with an electric motor (for example, a direct current motor) as a motive power source for switching a shift position have been known.

According to a shift switching mechanism as described above, there is no need to mechanically connect a shift lever and the shift switching mechanism as in a common switching mechanism that directly switches a shift position of an automatic transmission using manipulation force applied to a shift lever by a driver. Therefore, there is no limitation in layout when these components are mounted in a vehicle, and thus the degree of freedom in design can be increased. Further, there has been an advantage that mounting to a vehicle can be easily performed.

As a shift lever in such a shift switching mechanism, a momentary-type shift lever may be used. In the momentary-type shift lever, switching to a drive position such as the R, N, D, or B position and switching from the P position is performed according to manipulation of the shift lever starting from a reference position. The shift lever is provided with a shift sensor sensing movement of manipulation in a longitudinal direction and a select sensor sensing movement of manipulation in a lateral direction. Based on outputs from these sensors, a shift position is determined.

As a shift lever as described above, for example, Japanese Patent Laying-Open No. 2005-7993 discloses a shift device of a transmission appropriately responding to a driver's request in the shift device with a momentary function. The shift device of a transmission is a shift device of a transmission including a path for reaching a plurality of shift positions, and a momentary-type movable portion manipulated so as to move along the path by a driver. The movable portion is held at a predetermined reference position when it is not manipulated by the driver. The shift device includes recognition means for recognizing a shift position requested by the driver from holding of the movable portion at the shift position for a predetermined recognition time, and output means for outputting a control signal to the transmission so as to attain a power transmission state corresponding to the recognized shift position. The path includes the reference position, a first shift position representing one of the plurality of shift positions, and a second shift position representing one of the plurality of shift positions and provided between the reference position and the first shift position. When it is recognized that the movable portion is located at the first shift position, the power transmission state by the transmission is set to a first state. When it is recognized that the movable portion is located at the second shift position, the power transmission state by the transmission is set to a second state different from the first state. The shift device further includes setting means for setting the recognition time in accordance with a moving direction of the movable portion along the path.

According to the shift device of a transmission, a time for recognizing the second shift position in a first case where the driver performs manipulation based on a request to bring the power transmission state by the transmission into the second state and the movable portion is located at the second shift position, and a time for recognizing the second shift position in a second case where the movable portion comes to the second shift position on its way to return to the reference position can be set separately. Therefore, the driver's request can appropriately be recognized based on a time for which the movable portion is held at the second shift position.

However, if an abnormality occurs in a sensor during detection of the position of a shift lever with a select sensor and a shift sensor, a parking lock cannot be released depending on the state of the abnormality. For example, in a case where an abnormality occurs in the select sensor while it is detecting the position of the shift lever in a direction in which the shift lever is moved between the reference position and a neutral position, if it is unclear whether switching to the neutral position is performed, there is a possibility that a parking position cannot be released.

This is because, when the select sensor is abnormal, if position detection by the select sensor is not performed after switching to the parking position is performed, or if it is unclear whether switching to the neutral position is performed, it is also unclear whether switching to a forward drive position or a reverse drive position is performed. Therefore, it is impossible to release the parking position according to the intention of the driver when the select sensor is abnormal.

If it is impossible to release the parking position according to the intention of the driver, the parking lock cannot be released. Accordingly, for example, it is impossible to move a disabled vehicle by pushing the same with hands or using a tow truck or the like. In the aforementioned publication, the problems described above are not considered at all, and thus cannot be solved.

DISCLOSURE OF THE INVENTION

One object of the present invention is provide a shift switching device that releases a parking lock according to the intention of a driver even in the event of an abnormality in a sensor detecting the position of a shift lever.

A shift switching device in accordance with an aspect of the present invention includes a first detection unit detecting a position of a shift lever moving along a shift gate in a first direction and a second detection unit detecting a position of the shift lever in a second direction, for switching a shift position of a transmission mounted in a vehicle based on the position in the first direction and the position in the second direction. The shift position includes at least a parking position. The shift switching device further includes a processing unit connected to the first detection unit and the second detection unit. The processing unit determines whether or not the first detection unit is abnormal, and in a case where the processing unit determines that the first detection unit is abnormal, the processing unit changes a shift position corresponding to a position of the shift lever to a shift position releasing the parking position.

According to the present invention, in a case where the first detection unit is determined as abnormal, the position of the shift lever in the first direction cannot be detected. In this case, a shift position corresponding to a position of the shift lever is changed to a shift position releasing the parking position (for example, a neutral position). For example, a shift position specified by detecting the position in the second direction using the second detection unit is changed to a shift position releasing the parking position. Thereby, the parking position can be reliably released by manipulating the shift lever, and thus a parking lock can be released according to the intention of a driver. As a result, the vehicle can be moved by being pushed with hands or using a tow truck or the like. Therefore, a shift switching device that releases a parking lock according to the intention of a driver even in the event of an abnormality in a sensor detecting the position of a shift lever can be provided.

Preferably, in a case where the first detection unit is abnormal and in addition the shift position is the parking position, the processing unit changes the shift position corresponding to the position of the shift lever to the shift position releasing the parking position.

According to the present invention, in a case where the shift position is the parking position, the parking lock is in an actuated state. If the first detection unit is abnormal on this occasion, the position of the shift lever in the first direction cannot be detected. In a case where the first detection unit is abnormal and in addition the shift position is the parking position, the shift position corresponding to the position of the shift lever is changed to the shift position releasing the parking position (for example, the neutral position). For example, the shift position specified by detecting the position in the second direction using the second detection unit is changed to the shift position releasing the parking position. Thereby, the parking position can be reliably released by manipulating the shift lever, and thus the parking lock can be released according to the intention of a driver.

More preferably, a reference position serving as a starting point of manipulation of the shift lever is set in the shift gate. In a case where the first detection unit is abnormal and in addition the position of the shift lever is maintained at the reference position until a predetermined time elapses, the processing unit changes the shift position corresponding to the position of the shift lever to the shift position releasing the parking position.

According to the present invention, in a case where the position of the shift lever is maintained at the reference position until a predetermined time elapses, it can be determined that the shift lever is not in a state of being erroneously manipulated. In this case, the shift position corresponding to the position of the shift lever is changed to the shift position releasing the parking position (for example, the neutral position). Thereby, the parking position can be reliably released by manipulating the shift lever, and thus the parking lock can be released according to the intention of a driver.

More preferably, the shift position further includes a neutral position and a plurality of shift positions related to driving of the vehicle. In a case where the first detection unit is abnormal, the processing unit changes at least one of the plurality of shift positions corresponding to the position of the shift lever specified by the position in the second direction when the first detection unit is abnormal, to the neutral position.

According to the present invention, in a case where the first detection unit is abnormal, the processing unit changes at least one of the plurality of shift positions to the neutral position. If the first detection unit is abnormal, the position of the shift lever in the first direction cannot be detected. Therefore, at least one of the plurality of shift positions related to driving of the vehicle (for example, a forward drive position, a reverse drive position, or the like) specified by detecting the position of the shift lever in the second direction is changed to the neutral position. Thereby, the shift position can be reliably switched to the neutral position by manipulating the shift lever. That is, switching from the parking position to the neutral position can be performed even when there occurs an abnormality in the first detection unit. Therefore, the parking lock can be released according to the intention of a driver.

More preferably, the neutral position corresponds to a position at one end of a range in which the shift lever is movable in the first direction.

According to the present invention, if the first detection unit is abnormal, the position of the shift lever in the first direction cannot be detected. Accordingly, whether or not the shift position is moved to the neutral position cannot be determined. In this case, for example, if at least one of the plurality of shift positions related to driving of the vehicle specified by detecting the position of the shift lever in the second direction is changed to the neutral position, the shift position can be reliably switched to the neutral position by manipulating the shift lever. Therefore, the parking lock can be released according to the intention of a driver.

More preferably, the processing unit determines whether or not the first detection unit is abnormal based on a detection result of the first detection unit.

According to the present invention, whether or not the first detection unit is abnormal can be determined with high accuracy.

More preferably, the first detection unit outputs a voltage corresponding to the position of the shift lever in the first direction. The processing unit determines whether or not the first detection unit is abnormal based on a state of the output voltage.

According to the present invention, the processing unit determines whether or not the first detection unit is abnormal based on the state of the voltage output by the first detection unit (for example, the output voltage's fixation on a low side or fixation on a high side, a difference in output voltage values of two sensors, or the like). Thereby, whether or not the first detection unit is abnormal can be determined with high accuracy.

More preferably, in a case where the position of the shift lever specified by the position in the first direction is not a position corresponding to the shift position of the transmission in relation to the position in the second direction, the processing unit determines that the first detection unit is abnormal.

According to the present invention, in a case where the position of the shift lever specified by the position in the first direction is not a position corresponding to the shift position of the transmission in relation to the position in the second direction, the processing unit determines that the first detection unit is abnormal. Thereby, whether or not there occurs an abnormality in the detection result of the first detection unit can be determined with high accuracy.

More preferably, the shift position further includes a neutral position. In the case where the position of the shift lever specified by the position in the first direction is not the position corresponding to the shift position of the transmission in relation to the position in the second direction, the processing unit changes the shift position corresponding to the position of the shift lever to the neutral position.

According to the present invention, in the case where the position of the shift lever specified by the position in the first direction is not a position corresponding to the shift position of the transmission in relation to the position in the second direction, the processing unit changes the shift position to the neutral position. Thereby, the shift position can be reliably switched to the neutral position by manipulation of the shift lever by a driver even in the event of an abnormality in the first detection unit. Therefore, the parking lock can be released according to the intention of the driver.

More preferably, if the position of the shift lever is maintained until a predetermined first time elapses, the shift switching device switches the shift position of the transmission to the shift position corresponding to the position of the shift lever, and in a case where the first detection unit is abnormal, if the position of the shift lever is maintained until a predetermined second time longer than the first time elapses, the shift switching device switches the shift position of the transmission to the shift position corresponding to the position of the shift lever.

According to the present invention, in a case where the first detection unit is abnormal, if the position of the shift lever is maintained until a predetermined second time longer than the first time elapses, the shift position of the transmission is switched to the shift position corresponding to the position of the shift lever. This can reliably prevent erroneous determination of the shift position based on the position of the shift lever.

More preferably, the shift lever is a momentary-type shift lever.

According to the present invention, the parking lock can be released according to the intention of a driver even when there occurs an abnormality in the first detection unit, by applying the present invention to a momentary-type shift lever.

BRIEF DESCRIPTION OF THE DRAWINGS

FIG. 14 shows a plurality of combinations of shift positions read differently in the event of an abnormality.

BEST MODES FOR CARRYING OUT THE INVENTION

Figure 1:
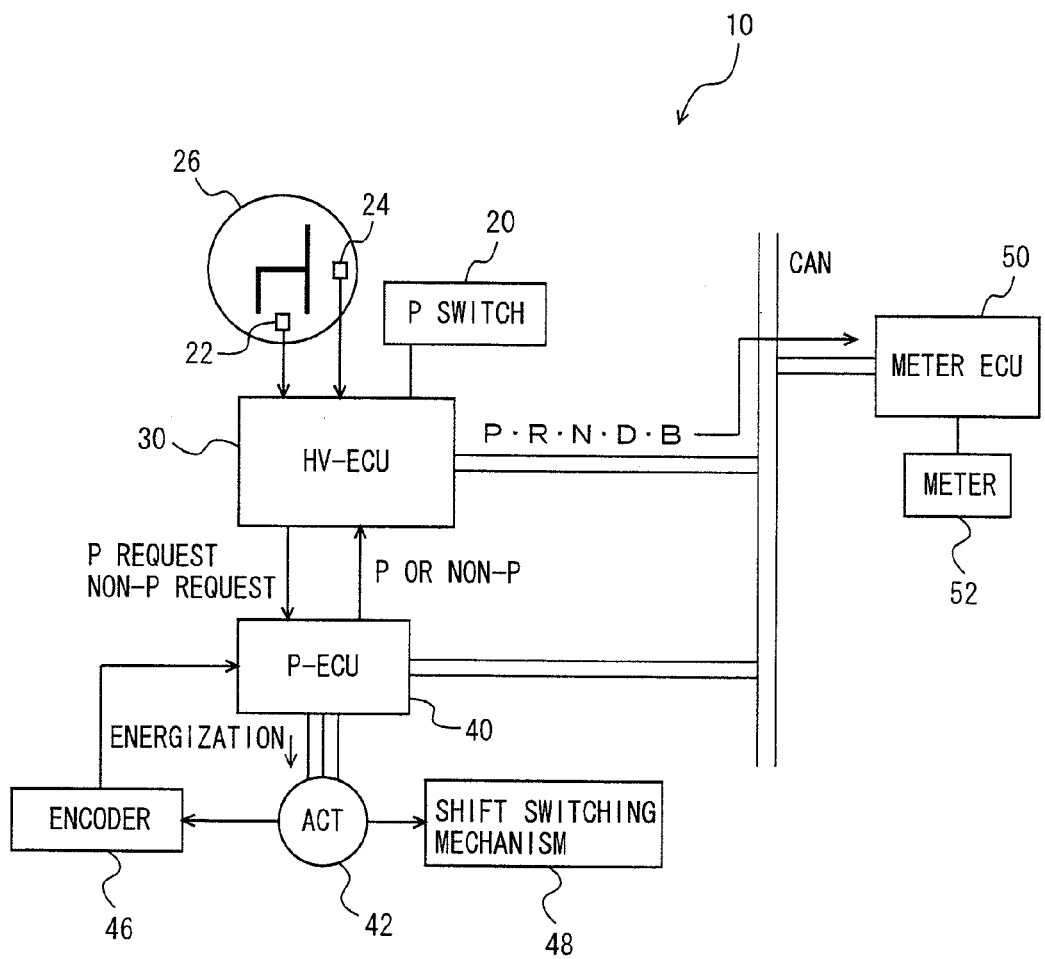
FIG. 1 shows a configuration of a shift control system 10 in accordance with the present embodiment.

Embodiments of the present invention will now be described with reference to the drawings. In the following description, identical parts will be designated by the same reference numerals. Since names and functions thereof are also the same, detailed description thereof will not be repeated.

First Embodiment

FIG. 1 shows a configuration of a shift control system 10 serving as a shift switching device in accordance with the present embodiment. Shift control system 10 in accordance with the present embodiment is used to switch a shift position of a vehicle. In the present embodiment, description will be given taking a hybrid vehicle as an example of a vehicle equipped with shift control system 10. However, the vehicle is not particularly limited to a hybrid vehicle, and any vehicle may be used as long as it is equipped with shift control system 10 switching a shift position of a transmission (in particular, switching between actuation and release of a parking lock) using at least drive force of an actuator.

Shift control system 10 includes a P switch 20, a shift lever mechanism 26, an HV (Hybrid Vehicle)—ECU (Electronic Control Unit) 30, a parking control device (hereinafter referred to as a "P-ECU") 40, an actuator 42, an encoder 46, a shift switching mechanism 48, a meter ECU 50, and a meter 52. Shift control system 10 functions as a shift-by-wire system switching a shift position by electric control. Specifically, shift switching mechanism 48 is driven by actuator 42 to switch a shift position.

P switch 20 is a switch for switching a shift position between a parking position (hereinafter referred to as a "P position") and positions other than the parking position (hereinafter referred to as "non-P positions"). A driver inputs an instruction to switch a shift position to the P position via P switch 20. P switch 20 may be a momentary switch. A P command signal indicating the instruction from the driver received by P switch 20 is transmitted to HV-ECU 30. It is to be noted a shift position may be switched from a non-P position to the P position by a component other than P switch 20 as described above.

Shift lever mechanism 26 includes a shift lever (not shown), a shift gate (not shown), a select sensor 22, and a shift sensor 24. The shift lever is moved along a passage formed in the shift gate. In the shift gate, positions corresponding to shift positions such as a forward drive position (hereinafter referred to as a "D position"), a reverse drive position (hereinafter referred to as an "R position"), a neutral position (hereinafter referred to as an "N position"), and a brake position (hereinafter referred to as a "B position") are set beforehand. Select sensor 22 detects a position of the shift lever in a select direction. Select sensor 22 transmits to HV-ECU 30 a signal indicating the detected position in the select direction. Shift sensor 24 detects a position of the shift lever in a shift direction. Shift sensor 24 transmits to HV-ECU 30 a signal indicating the detected position in the shift direction. The select direction and the shift direction will be described later.

HV-ECU 30 manages entire operation of shift control system 10. Specifically, when HV-ECU 30 receives the P command signal from P switch 20, HV-ECU 30 transmits a P request signal to P-ECU 40. HV-ECU 30 also determines a shift position corresponding to the position of the shift lever based on detection results from select sensor 22 and shift sensor 24. When the shift position is determined, HV-ECU 30 performs control switching a shift position in a transmission (not shown) to the determined shift position, and transmits to meter ECU 50 a display control signal indicating the state of the current shift position. It is to be noted that, although the transmission in the present embodiment is a transmission configured of a continuously variable transmission mechanism, it may be configured of a gear-type transmission mechanism.

Further, for example when a shift position is the parking position and the shift position determined by the position of the shift lever is any of the D position, N position, and R position, HV-ECU 30 transmits a non-P request signal to P-ECU 40. HV-ECU 30 is connected (for example to a CAN (Controller Area Network)) such that it can mutually communicate with P-ECU 40 and meter ECU 50.

Meter ECU 50 transmits to meter 52 the display control signal from HV-ECU 30 for an instruction or a warning to the driver. Meter 52 displays the state of equipment of the vehicle, the state of the shift position, and the like.

When P-ECU 40 receives a P request signal or a non-P request signal from HV-ECU 30, P-ECU 40 controls operation of actuator 42 driving shift switching mechanism 48 to switch the shift position from one to the other of the P position and a non-P position, and transmits to HV-ECU 30 a signal indicating whether the current shift position is the P position or a non-P position.

If the driver performs manipulation corresponding to transmission of a P command signal at P switch 20 (for example, presses a button) when the shift position is a non-P position, P-ECU 40 receives a P request signal from HV-ECU 30 and switches the shift position from the non-P position to the P position. P-ECU 40 also transmits to HV-ECU 30 a signal indicating that the current shift position is the P position. Based on the received signal, HV-ECU 30 transmits to meter 52 via meter ECU 50 a display control signal for performing display corresponding to the P position. Based on the received display control signal, meter 52 displays that the current shift position is the P position. It is to be noted that P-ECU 40 may transmit to meter ECU 50 a display control signal for causing meter 52 to perform display corresponding to the P position.

Actuator 42 is configured of a switched reluctance motor (hereinafter referred to as an "SR motor"), and receives an actuator control signal from P-ECU 40 and drives shift switching mechanism 48. Although actuator 42 will be described as an actuator configured of a motor in the present invention, it may be a hydraulically operated actuator. Encoder 46 rotates integrally with actuator 42, and detects the rotation state of the SR motor. Encoder 46 of the present embodiment is a rotary encoder outputting A-phase, B-phase, and Z-phase signals. P-ECU 40 obtains the signals output from encoder 46 to grasp the rotation state of the SR motor, and performs control of energization for driving the SR motor.

Figure 2:
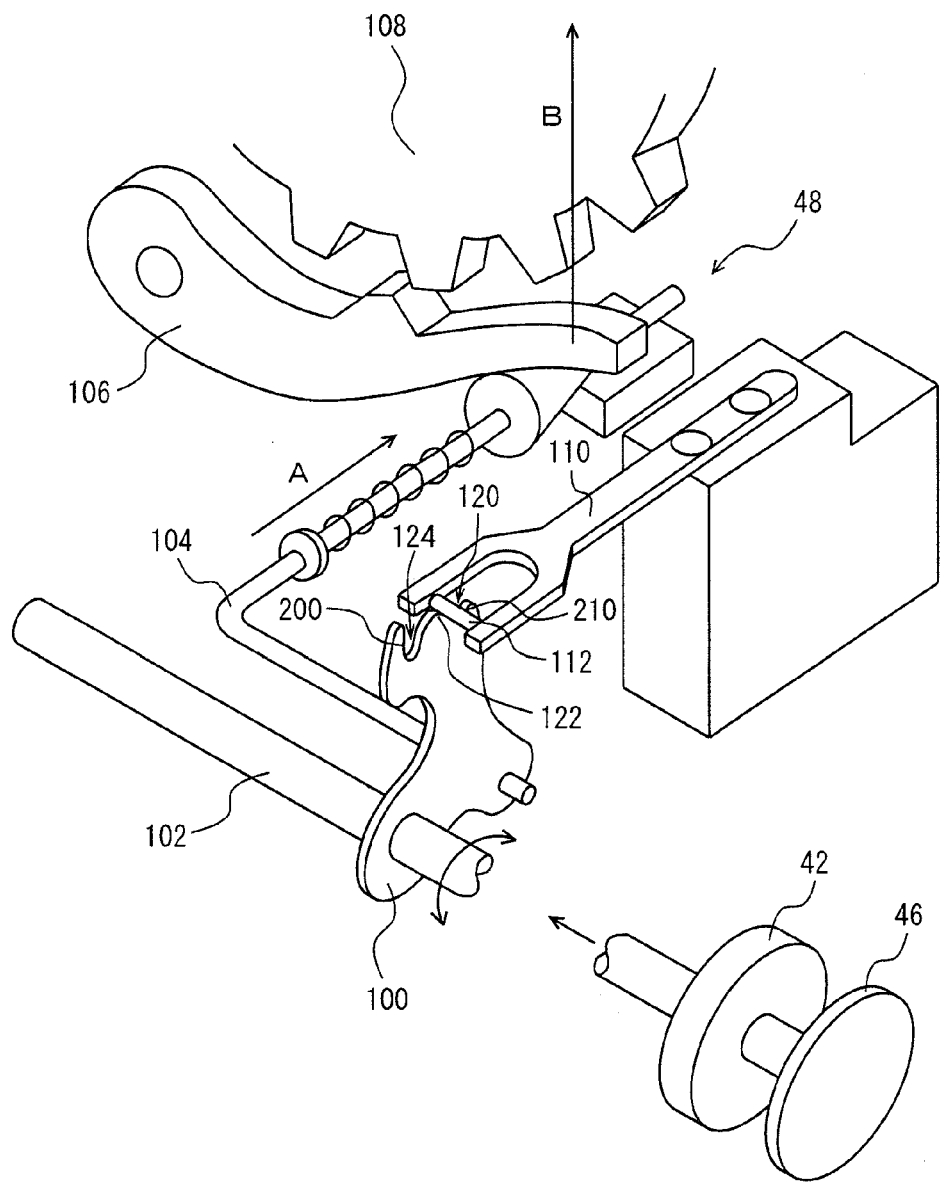
FIG. 2 shows a configuration of a shift switching mechanism of FIG. 1.

FIG. 2 shows a configuration of shift switching mechanism 48. Hereinafter, description will be given on the assumption that the shift position refers to the P position and the non-P position, and does not include the R, N, and D positions as non-P positions. However, the R, N, and D positions may be included. Specifically, although description will be given in the present embodiment on a two-position configuration having the P position and the non-P position, a four-position configuration having the P position and non-P positions including the R, N, and D positions may be employed.

Shift switching mechanism 48 includes a shaft 102 rotated by actuator 42, a detent plate 100 rotated according to rotation of shaft 102, a rod 104 operated according to rotation of detent plate 100, a parking lock gear 108 fixed to an output shaft of a transmission not shown, a parking lock pole 106 for locking parking lock gear 108, and a detent spring 110 and a roller 112 limiting the rotation of detent plate 100 and fixing a shift position. Detent plate 100 is driven by actuator 42 to switch a shift position. Further, encoder 46 functions as counting means obtaining a counted value corresponding to the rotation amount of actuator 42.

FIG. 2 shows a state where the shift position is the non-P position. Since parking lock pole 106 does not lock parking lock gear 108 in this state, rotation of a drive shaft of the vehicle is not prevented. When shaft 102 is rotated by actuator 42 in a clockwise direction from this state, rod 104 is pushed via detent plate 100 in a direction indicated by an arrow A shown in FIG. 2, and parking lock pole 106 is pushed up by a tapered portion provided at a tip end of rod 104 in a direction indicated by an arrow B shown in FIG. 2. According to the rotation of detent plate 100, roller 112 of detent spring 110 located at one of two valleys provided at the top of detent plate 100, that is, a non-P position location 120, passes over a peak 122 and moves to the other valley, that is, a P position location 124. Roller 112 is provided to detent spring 110 to be rotatable about an axial direction thereof. When detent plate 100 is rotated to allow roller 112 to be located at P position location 124, parking lock pole 106 is pushed up to a position where a projected portion of parking lock pole 106 engages between teeth of parking lock gear 108. Thereby, the drive shaft of the vehicle is mechanically secured, and the shift position is switched to the P position.

In shift control system 10 in accordance with the present embodiment, P-ECU 40 controls the rotation amount of actuator 42 so as to reduce impact given when roller 112 of detent spring 110 falls after passing over peak 122, in order to reduce load on the components of the shift switching mechanism such as detent plate 100, detent spring 110, and shaft 102, applied when the shift position is switched.

Actuator 42 rotates detent plate 100 provided to manual shaft 102. Rotations in predetermined directions are respectively defined by a P wall 200 and a non-P wall 210 formed in detent plate 100.

Figure 3:
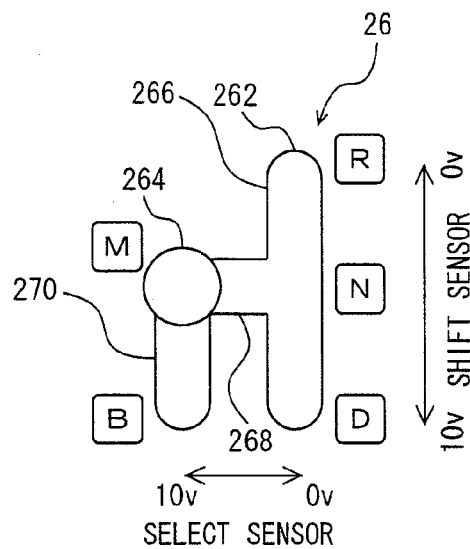
FIG. 3 shows a configuration of a shift lever mechanism.

As shown in FIG. 3, shift lever mechanism 26 includes a shift gate 262 and a shift lever 264. In the present embodiment, shift lever 264 is a momentary type shift lever. Specifically, the driver can move shift lever 264 along a path formed in shift gate 262, using an M position in FIG. 3 as a reference position. In the present embodiment, shift gate 262 corresponds to a shift gate of a right-hand drive vehicle.

In a case where the driver does not apply manipulation force to shift lever 264, shift lever 264 automatically returns to the M position as the reference position by means of a mechanical mechanism utilizing a spring or the like provided to shift lever 264. Since the structure and operation of a momentary type shift lever are well-known techniques, detailed description thereof will not be provided.

In addition to the M position, shift gate 262 is provided with the R position, N position, D position, and B position. In the present embodiment, the shift direction refers to an up-down direction on a paper plane of FIG. 3. In shift gate 262, the R position and the D position are associated with positions at both ends of a shift passage (1) 266 formed along the shift direction. The N position is associated with a position in the middle of shift passage (1) 266.

In the present embodiment, the select direction refers to a left-right direction on the paper plane of FIG. 3. A select passage 268 having one end connected to the position of the N position in shift passage (1) 266 is further formed in shift gate 262 along the select direction. The M position is associated with a position at the other end of select passage 268.

In addition, a shift passage (2) 270 having one end connected to the position of the M position in select passage 268 is further formed in shift gate 262 along the shift direction. The B position is associated with the other end of shift passage (2) 270 in a lower direction on the paper plane of FIG. 3.

In a case where shift lever 264 is moved by the driver from the M position to a specific shift position, and the position of shift lever 264 is maintained at the move destination position until a predetermined time Tn(1) elapses, HV-ECU 30 determines the shift position corresponding to the move destination position. In the present embodiment, the select direction corresponds to a first direction, and the shift direction corresponds to a second direction.

Select sensor 22 transmits to HV-ECU 30 a voltage signal corresponding to the position of shift lever 264 in the select direction. In the present embodiment, select sensor 22 outputs a voltage within a range from a lower limit value V_Lo(1) to an upper limit value V_Hi(1) corresponding to boundaries of a range in which shift lever 264 is movable in the select direction. Lower limit value V_Lo(1) and upper limit value V_Hi(1) are each an output voltage value within a range of at least 0 V to 10 V.

The relation between the position of shift lever 264 in the select direction and the voltage is, for example, a linear relation. The above relation may not be a linear relation if the position of shift lever 264 in the select direction can be computed based on an output voltage value of select sensor 22.

Shift sensor 24 transmits to HV-ECU 30 a voltage signal corresponding to the position of shift lever 264 in the shift direction. In the present embodiment, shift sensor 24 outputs a voltage within a range from a lower limit value V_Lo(2) to an upper limit value V_Hi(2) corresponding to boundaries of a range in which shift lever 264 is movable in the shift direction. Lower limit value V_Lo(2) and upper limit value V_Hi(2) are each an output voltage value within a range of at least 0 V to 10 V.

The relation between the position of shift lever 264 in the shift direction and the voltage is, for example, a linear relation. The above relation may not be a linear relation if the position of shift lever 264 in the shift direction can be computed based on an output voltage value of shift sensor 24.

HV-ECU 30 determines the position of shift lever 264 in shift gate 262 based on an output voltage corresponding to the position thereof in the select direction received from select sensor 22 and an output voltage corresponding to the position thereof in the shift direction received from shift sensor 24.

In a case where the position of shift lever 264 is moved to a shift position other than the M position in shift gate 262, and shift lever 264 is maintained at the move destination position until predetermined time Tn(1) elapses, HV-ECU 30 determines the shift position corresponding to the move destination position.

Figure 4:
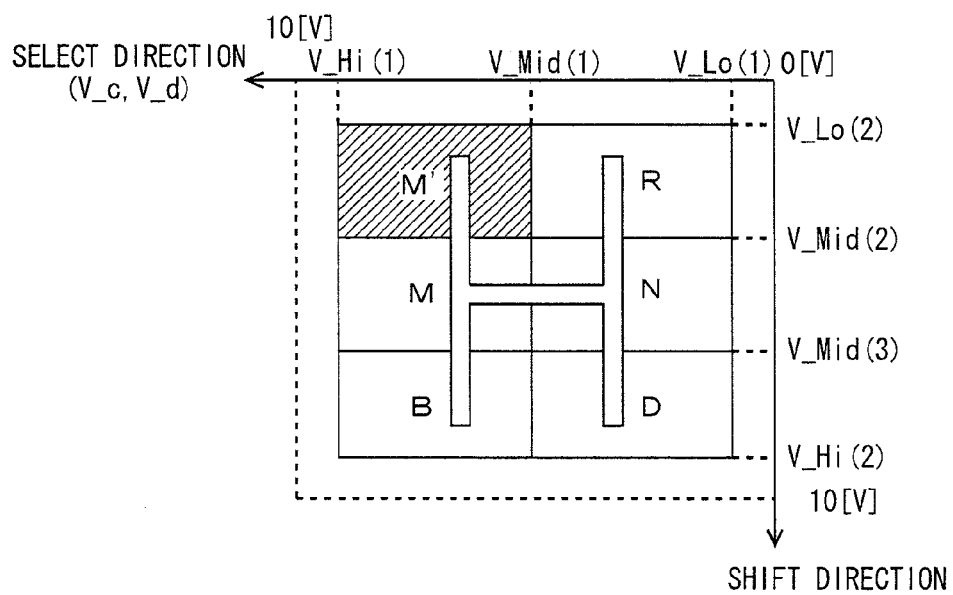
FIG. 4 shows regions for determining shift positions (part 1).

In a memory of HV-ECU 30, for example, a map indicating the relation among the output voltage value of select sensor 22, the output voltage value of shift sensor 24, and the shift positions as shown in FIG. 4 is stored beforehand.

As shown in FIG. 4, upper limit value V_Hi(1) and lower limit value V_Lo(1) of the output voltage are set for the boundaries of the range in which shift lever 264 is movable in the select direction. Upper limit value V_Hi(1) and lower limit value V_Lo(1) are predetermined output voltage values. They are not particularly limited, and adapted through design or experiments.

In addition, a threshold value V_Mid(1) is set between upper limit value V_Hi(1) and lower limit value V_Lo(1). A 0 V side is indicated in a right direction on a paper plane of FIG. 4. Upper limit value V_Hi(1), threshold value V_Mid(1), and lower limit value V_Lo(1) are set within the range between 0 V and 10 V.

Similarly, upper limit value V_Hi(2) and lower limit value V_Lo(2) of the output voltage are set for the boundaries of the range in which shift lever 264 is movable in the shift direction. A 0 V side is indicated in an upper direction on the paper plane of FIG. 4. Upper limit value V_Hi(2) and lower limit value V_Lo(2) are predetermined output voltage values. They are not particularly limited, and adapted through design or experiments.

In addition, a threshold value V_Mid(2) and a threshold value V_Mid(3) greater than V_Mid(2) are set between upper limit value V_Hi(2) and lower limit value V_Lo(2). The 0 V side is indicated in the upper direction on the paper plane of FIG. 4. Upper limit value V_Hi(2), threshold values V_Mid(2) and V_Mid(3), and lower limit value V_Lo(2) are set in the range between 0 V and 10 V.

For example, lower limit values V_Lo(1) and V_Lo(2) may be set to 0 V, and upper limit values V_Hi(1) and V_Hi(2) may be set to 10 V. Threshold values V_Mid(1) to V_Mid(3) are predetermined output voltage values. They are not particularly limited, and adapted through design or experiments.

As shown in FIG. 4, separated six regions are set by V_Hi(1), V_Mid(1), and V_Lo(1) in the select direction and V_Hi(2), V_Mid(2), V_Mid(3), and V_Lo(2) in the shift direction. The shift positions are associated with the separated six regions to match the shape of shift gate 262. Specifically, the R position, the N position, the D position, an M' position, the M position, and the B position are associated with the separated six regions. The M' position shown in a hatched region in FIG. 4 is a region that does not correspond to any of a plurality of shift positions of the transmission.

In the present embodiment, the R position is associated with a region that is between V_Lo(1) and V_Mid(1) in the select direction and between V_Lo(2) and V_Mid(2) in the shift direction.

The N position is associated with a region that is between V_Lo(1) and V_Mid(1) in the select direction and between V_Mid(2) and V_Mid(3) in the shift direction.

The D position is associated with a region that is between V_Lo(1) and V_Mid(1) in the select direction and between V_Mid(3) and V_Hi(2) in the shift direction.

The M' position is associated with a region that is between V_Mid(1) and V_Hi(1) in the select direction and between V_Lo(2) and V_Mid(2) in the shift direction.

The M position is associated with a region that is between V_Mid(1) and V_Hi(1) in the select direction and between V_Mid(2) and V_Mid(3) in the shift direction.

The B position is associated with a region that is between V_Mid(1) and V_Hi(1) in the select direction and between V_Mid(3) and V_Hi(2) in the shift direction.

HV-ECU 30 determines the shift position corresponding to the position of shift lever 264 as described above based on the voltage signals output from select sensor 22 and shift sensor 24, and controls the transmission to switch to the determined shift position.

The present invention is characterized in that, in the vehicle having a structure as described above, HV-ECU 30 determines whether or not select sensor 22 is abnormal, and in a case where it determines that select sensor 22 is abnormal, HV-ECU 30 changes the shift position corresponding to the position of shift lever 264 to a shift position releasing the parking position.

HV-ECU 30 determines whether or not select sensor 22 is abnormal based on the detection result of select sensor 22. In the present embodiment, HV-ECU 30 determines whether or not select sensor 22 is abnormal based on the state of the voltage output from select sensor 22. In the present embodiment, shift sensor 24 includes two sensors, and output voltage values V_a and V_b are output from the respective sensors to HV-ECU 30. Further, select sensor 22 includes two sensors, and output voltage values V_c and V_d are output from the respective sensors to HV-ECU 30.

Figures 5, 6:
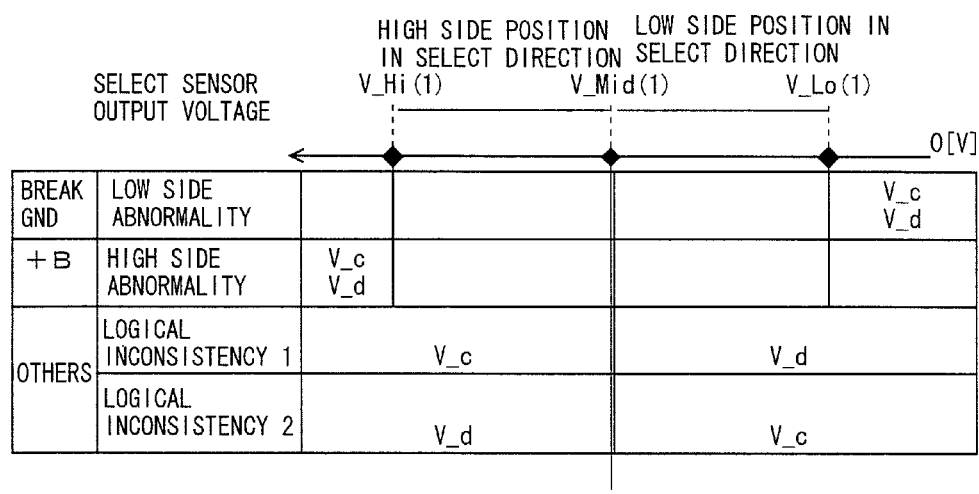
FIG. 5 shows states of abnormalities in a select sensor.
FIG. 6 shows shift positions read differently in the event of an abnormality.

As shown in FIG. 5, in a case where both output voltage values V_c and V_d of select sensor 22 are lower than V_Lo (1), HV-ECU 30 determines that there occurs an abnormality that the output voltage is fixed on a low side due to a break or a short circuit to ground (GND short circuit) in select sensor 22.

In a case where both output voltage values V_c and V_d of select sensor 22 are higher than V_Hi(1), HV-ECU 30 determines that there occurs an abnormality that the output voltage is fixed on a high side due to a short circuit inside select sensor 22.

Further, in a case where output voltage values V_c and V_d of select sensor 22 are different from each other, HV-ECU 30 determines that there occurs an abnormality of logical inconsistency.

Alternatively, in a case where the position of shift lever 264 specified by the position in the select direction is not a position corresponding to the shift position of the transmission in relation to the position in the shift direction, HV-ECU 30 may determine that select sensor 22 is abnormal.

For example, HV-ECU 30 determines that select sensor 22 is abnormal in a case where it determines that shift lever 264 is within the region of the M' position based on the output voltage values of select sensor 22 and shift sensor 24.

Although abnormality of select sensor 22 is determined by detecting fixation on the low side, fixation on the high side, logical inconsistency, and the M' position, abnormality of select sensor 22 may be determined by any of the above techniques, or may be determined by combining two or more of the above techniques.

When HV-ECU 30 determines that select sensor 22 is abnormal, HV-ECU 30 changes a shift position corresponding to the position of shift lever 264 when select sensor 22 is normal.

For example, as shown in FIG. 6, the positions of shift lever 264 associated with the M position and the N position when select sensor 22 is normal are both read as the M position when select sensor 22 is abnormal.

Further, the positions of shift lever 264 associated with the shift positions related to the driving of the vehicle (for example, the R position, the D position, and the B position) when the select sensor is normal are all read as the N position when select sensor 22 is abnormal. Preferably, it is desirable that the M' position is read as the N position.

Figure 7:
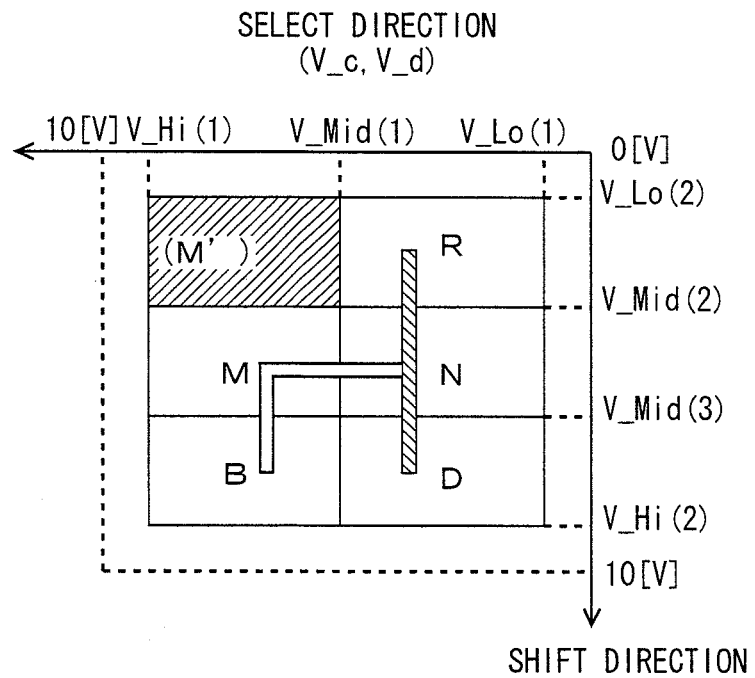
FIG. 7 shows regions for determining shift positions (part 2).

With such a configuration, for example, in a case where the output voltage of select sensor 22 is fixed on the low side, only a path indicated by hatched lines in FIG. 7 can be detected, and thus HV-ECU 30 cannot determine the shift positions other than the R position, the N position, and the D position. In this case, the position of the N position in the normal state is read as the M position by reading the shift position differently using the map shown in FIG. 6. If shift lever 264 is moved to the D position or the R position in the normal state on this occasion, the shift position is read as the N position, and thus the parking position can be released.

Figure 8:
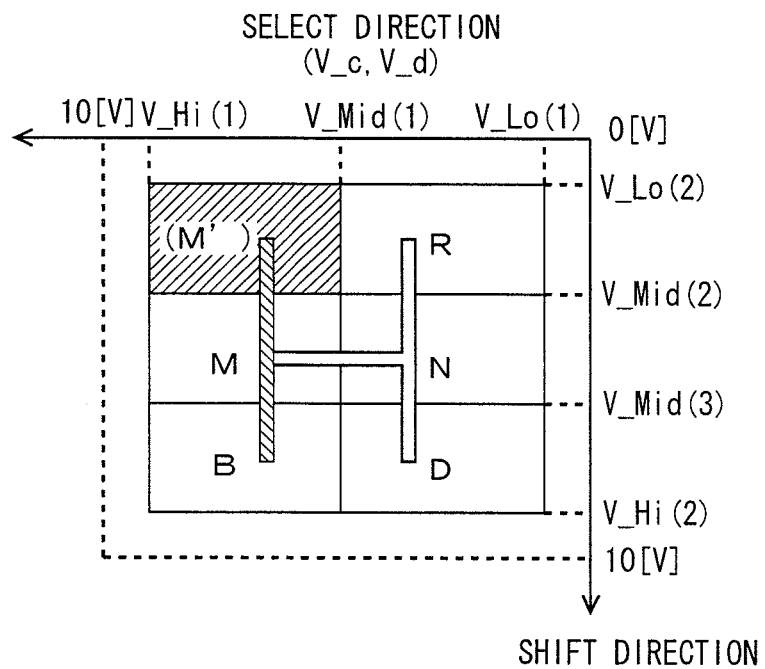
FIG. 8 shows regions for determining shift positions (part 3).

Alternatively, in a case where the output voltage of select sensor 22 is fixed on the high side, only a path indicated by hatched lines in FIG. 8 can be detected, and thus HV-ECU 30 cannot determine the shift positions other than the M' position, the M position, and the B position. In this case, the positions of the M' position and the B position in the normal state are read as the N position by reading the shift positions differently using the map shown in FIG. 6. If shift lever 264 is moved to the B position in the normal state on this occasion, the shift position is read as the N position, and thus the parking position can be released. Alternatively, even if shift lever 264 is moved to the R position but erroneously determined as the M' position, the shift position is read as the N position, and thus the parking position can be released.

Figure 9:
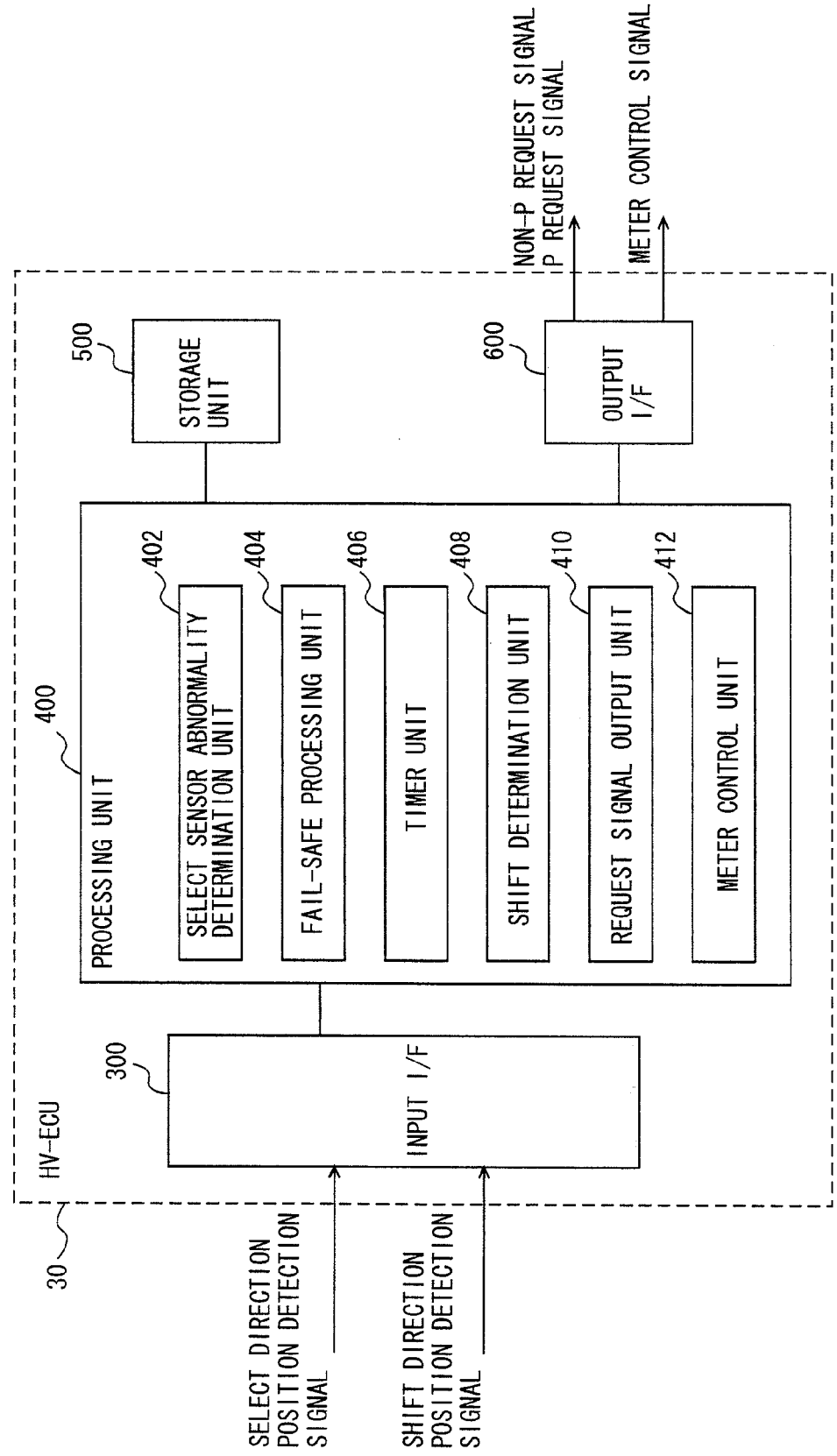
FIG. 9 is a functional block diagram of an HV-ECU of a shift switching device in accordance with a first embodiment.

FIG. 9 shows a functional block diagram of HV-ECU 30 of the shift switching device in accordance with the present embodiment. HV-ECU 30 includes an input interface (hereinafter referred to as an input I/F) 300, a processing unit 400, a storage unit 500, and an output interface (hereinafter referred to as an output I/F) 600.

Input I/F 300 receives a select direction position detection signal (i.e., a signal for detecting the position in the select direction) from select sensor 22, and a shift direction position detection signal (i.e., a signal for detecting the position in the shift direction) from shift sensor 24.

Processing unit 400 includes a select sensor abnormality determination unit 402, a fail-safe processing unit 404, a timer unit 406, a shift determination unit 408, a request signal output unit 410, and a meter control unit 412.

Select sensor abnormality determination unit 402 determines whether or not select sensor 22 is abnormal based on the detection result of select sensor 22. Since the method of determining abnormality of select sensor 22 is as described above, detailed description thereof will not be repeated. When select sensor abnormality determination unit 402 determines that select sensor 22 is abnormal, select sensor abnormality determination unit 402 turns on a select sensor abnormality determination flag.

When select sensor 22 is determined as abnormal, fail-safe processing unit 404 performs fail-safe processing. Specifically, fail-safe processing unit 404 turns on a fail-safe permission flag simultaneously when the select sensor abnormality determination flag is turned on. On this occasion, fail-safe processing unit 404 changes the shift position corresponding to the position of shift lever 264 when select sensor 22 is normal, as shown in FIG. 6. Fail-safe processing unit 404 may perform fail-safe processing when the select sensor abnormality determination flag is on.

Timer unit 406 measures a time that elapses after the position of shift lever 264 is stopped. In the present embodiment, for example, timer unit 406 counts stop times at the N position and the M position. The stop of the position of shift lever 264 may be determined based on the output voltage values of select sensor 22 and shift sensor 24. For example, timer unit 406 may reset a count value to an initial value whenever there is a change in the output voltage value of select sensor 22 or shift sensor 24. When measurement of the elapsed time is started, timer unit 406 increments the count value by a predetermined value for each calculation cycle.

Shift determination unit 408 determines whether or not the shift position read differently using the detection results of select sensor 22 and shift sensor 24 and the map shown in FIG. 6 is the N position. Specifically, when a time that elapses after the position of shift lever 264 is stopped at a position corresponding to a shift position read as the N position is equal to or longer than a predetermined standby time Tn(2), shift determination unit 408 determines that the shift position is the N position.

When select sensor 22 is abnormal, if the position of shift lever 264 is stopped at the position corresponding to the N position and maintained until predetermined standby time Tn(2) longer than standby time Tn(1) in the normal state elapses, shift determination unit 408 determines that the shift position is the N position. It is to be noted that, for example, if the fail-safe permission flag is on, shift determination unit 408 may change standby time Tn(1) to standby time Tn(2).

When the shift position is determined as the N position, request signal output unit 410 generates a non-P request signal, and transmits the non-P request signal to P-ECU 40 via output I/F 600. P-ECU 40 receives the non-P request signal, and if the position of roller 112 based on the rotation amount of shaft 102 detected by encoder 46 is P position location 124, P-ECU 40 transmits to actuator 42 a control signal to move roller 112 to non-P position location 120.

Meter control unit 412 generates a display control signal corresponding to the determined shift position, and transmits the display control signal to meter ECU 50 via output I/F 600. Meter ECU 50 causes meter 52 to display the contents corresponding to the received display control signal. Alternatively, meter ECU 50 turns on a desired indication lamp of meter 52.

In the present embodiment, although select sensor abnormality determination unit 402, fail-safe processing unit 404, timer unit 406, shift determination unit 408, and request signal output unit 410 are each described as functioning as software implemented by a CPU as processing unit 400 executing a program stored in storage unit 500, they may be implemented by hardware. Such a program is recorded in a storage medium and mounted in the vehicle.

Storage unit 500 stores various information, programs, threshold values, maps, and the like, and data is read by processing unit 400 or stored from processing unit 400, if needed.

Hereinafter, a control structure of a program executed by HV-ECU 30 of the shift switching device in accordance with the present embodiment will be described with reference to FIG. 10.

In step (hereinafter referred to as "S") 100, HV-ECU 30 determines whether or not select sensor 22 is abnormal. If select sensor 22 is abnormal (YES in S100), the processing proceeds to S102. Otherwise (NO in S100), the processing returns to S100.

In S102, HV-ECU 30 turns on a fail-safe permission flag. In S104, HV-ECU 30 determines whether or not the shift position read differently using the map shown in FIG. 6 when select sensor 22 is abnormal is the N position. If the shift position is read as the N position (YES in S104), the processing proceeds to S106. Otherwise (NO in S104), the processing returns to S104.

In S106, HV-ECU 30 determines whether or not the position of shift lever 264 is maintained until predetermined time Tn(2) elapses. If the position of shift lever 264 is maintained until predetermined time Tn(2) elapses (YES in S106), the processing proceeds to S108. Otherwise (NO in S106), the processing returns to S104.

In S108, HV-ECU 30 outputs an non-P request signal to P-ECU 40.

Operation of HV-ECU 30 of the shift switching device in accordance with the present embodiment based on the structure and the flowchart as described above will be described with reference to FIG. 11.

When there occurs an abnormality in the detection result of select sensor 22 at a time T(0), abnormality of select sensor 22 is determined at a time T(1) (YES in S100), and a select sensor abnormality determination flag is turned on. On this occasion, a fail-safe permission flag is turned on, and fail-safe processing is performed (S102).

When shift lever 264 is moved to a position corresponding to any shift position among the R position, the D position, and the B position by the driver's manipulation at a time T(2), the shift position is read differently and determined as the N position (YES in S104).

At a time T(3) when predetermined time Tn(2) elapses after the shift position is determined as the N position, it is determined that the shift position is the N position. On this occasion, HV-ECU 30 outputs an non-P request signal to P-ECU 40. When P-ECU 40 receives the non-P request signal, the position of roller 112 is moved to non-P position location 124 by rotation force of actuator 42. As a result, the projected portion of parking lock pole 106 is moved away from the teeth of parking lock gear 108, and thereby the parking lock is released.

When the driver stops applying manipulation force to shift lever 264 at a time T(4), shift lever 264 returns to the position corresponding to the M position.

As has been described above, according to the shift switching device in accordance with the present embodiment, by changing at least one of a plurality of shift positions specified by detecting the position of the shift lever in the shift direction to the neutral position, the shift position can be reliably switched to the neutral position, which is the shift position releasing the parking position, by manipulating the shift lever. Thereby, switching from the parking position to the neutral position can be performed even when there occurs an abnormality in the select sensor. Thus, the parking lock can be released according to the intention of the driver. As a result, the vehicle can be moved by being pushed with hands or using a tow truck or the like. Therefore, a shift switching device that releases a parking lock according to the intention of a driver even in the event of an abnormality in a sensor during detection of the position of a shift lever can be provided.

Further, the HV-ECU determines whether or not the select sensor is abnormal based on the state of the voltage output from the select sensor (for example, voltage's fixation on the low side or fixation on the high side, a difference in the output voltage values of the two sensors, or the like). Thereby, whether or not the select sensor is abnormal can be determined with high accuracy.

Further, switching the shift position when the select sensor is abnormal and the position of the shift lever is maintained until standby time Tn(2) longer than standby time Tn(1) elapses can reliably prevent erroneous determination of the shift position based on the position of the shift lever. It is to be noted that standby time Tn(1) and standby time Tn(2) may be the same. With such a configuration, the driver is less likely to feel uncomfortable.

In a case where the select sensor is abnormal and in addition the shift position is the parking position, the HV-ECU may change the shift position corresponding to the position of the shift lever. With such a configuration, the shift position can be reliably switched to the neutral position by manipulating the shift lever even when there occurs an abnormality in the select sensor. Thus, the parking lock can be released according to the intention of the driver.

Although the present embodiment has described an exemplary case where the present invention is applied to a right-hand drive vehicle, the present invention is not particularly limited thereto, and may be applied, for example, to a left-hand drive vehicle.

For example, in a left-hand drive vehicle, the shift gate has a shape symmetrical to that of shift gate 262 of the right-hand drive vehicle.

Figure 12:
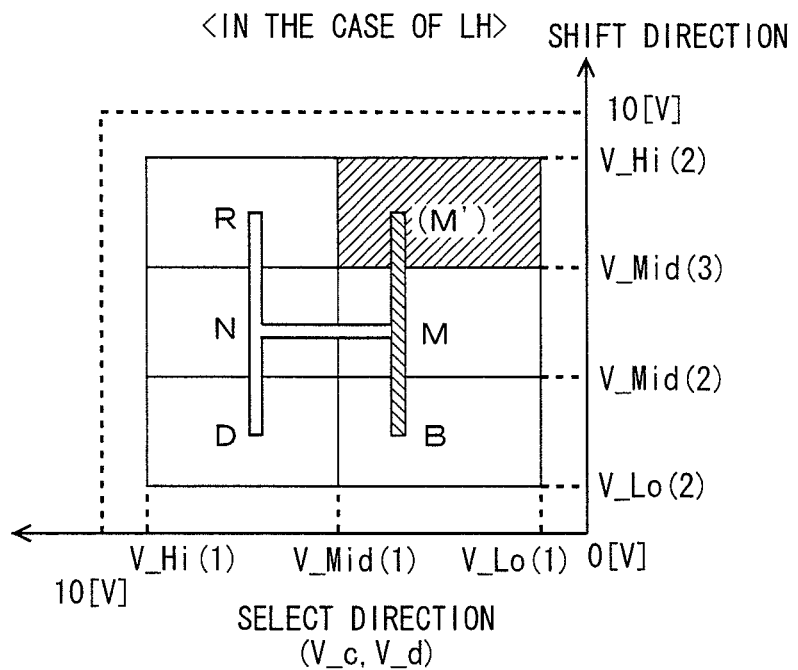
FIG. 12 shows regions for determining shift positions in a left-hand drive vehicle (part 1).

Therefore, for example, in a case where the output voltage of select sensor 22 is fixed on the low side, only a path indicated by hatched lines in FIG. 12 can be detected, and thus HV-ECU 30 cannot determine the shift positions other than the M' position, the M position, and the B position. In this case, the positions of the M' position and the B position in the normal state are read as the N position by reading the shift positions differently using the map shown in FIG. 6. If shift lever 264 is moved to the B position in the normal state on this occasion, the shift position is read as the N position, and thus the parking position can be released. Alternatively, even if the shift lever is moved to the R position but erroneously determined as the M' position, the shift position is read as the N position, and thus the parking position can be released.

Figure 13:
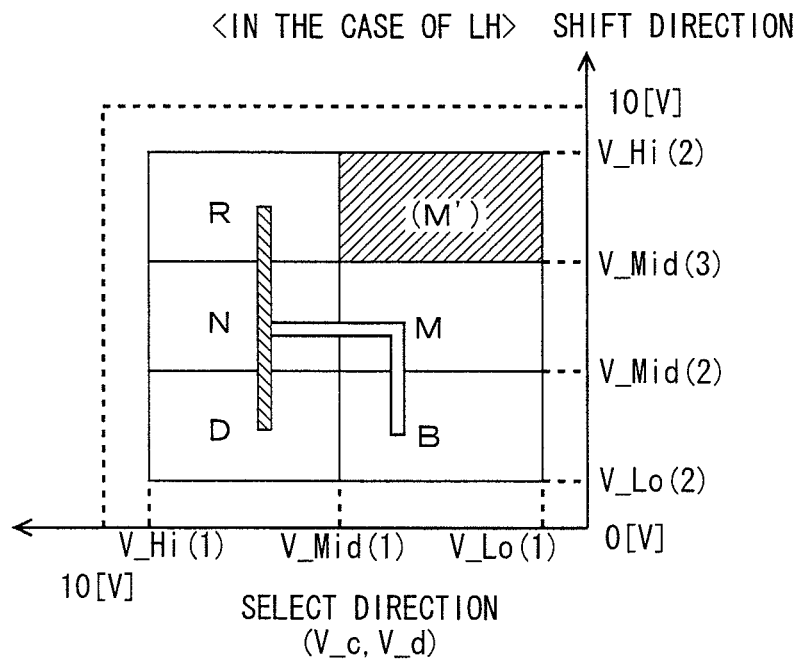
FIG. 13 shows regions for determining shift positions in a left-hand drive vehicle (part 2).

Further, in a case where the output voltage of select sensor 22 is fixed on the high side, only a path indicated by hatched lines in FIG. 13 can be detected, and thus HV-ECU 30 cannot determine the shift positions other than the R position, the N position, and the D position. In this case, the position of the N position in the normal state is read as the M position by reading the shift position differently using the map shown in FIG. 6. If shift lever 264 is moved to the D position or the R position in the normal state on this occasion, the shift position is read as the N position, and thus the parking position can be released.

Therefore, the shift position can be reliably switched to the N position by the driver's manipulation of shift lever 264, the parking lock can be released.

Further, although the present embodiment has described the case where the N position is read as the M position and a plurality of other shift positions related to the driving of the vehicle are read as the N position as shown in FIG. 6, the present invention is not particularly limited to such a reading manner.

For example, the shift position may be changed using any of patterns (A) to (E) as shown in FIG. 14. Alternatively, one of patterns (A) to (E) may be selected according to the state of the abnormality of select sensor 22 (for example, fixation on the low side, fixation on the high side, or logical inconsistency). With this configuration, a reading range can be set according to the state of the abnormality.

Pattern (A) is a pattern in which only the M' position is read as the N position. Pattern (B) is a pattern in which the D position and the B position are read as the N position. Pattern (C) is a pattern in which only the R position is read as the N position.

Pattern (D) is a pattern in which the R position, the D position, the B position, and the M' position are read as the N position. When compared with FIG. 6, pattern (D) is different in that the shift position for the N position is not changed.

Pattern (E) is a pattern in which the R position, the D position, and the B position are read as the N position. The same effect as that described above can also be obtained by using the shift position using any of patterns (A) to (E).

Second Embodiment

A shift switching device in accordance with a second embodiment will now be described. When compared with the configuration of the shift switching device in accordance with the first embodiment described above, the shift switching device in accordance with the present embodiment is different in the control structure of a program executed by HV-ECU 30. Other than that, the shift switching device in accordance with the present embodiment has the same configuration as that of the shift switching device in accordance with the first embodiment described above. They will be designated by the same reference numerals. Since names and functions thereof are also the same, detailed description thereof will not be repeated here.

In the present embodiment, HV-ECU 30 is characterized in that, in a case where select sensor 22 is abnormal and in addition the position of shift lever 264 is maintained at the reference position until a predetermined time Tm elapses, HV-ECU 30 changes the shift position corresponding to the position of the shift lever. Specifically, HV-ECU 30 determines whether or not the position of shift lever 264 is maintained until predetermined time Tm elapses after a select sensor abnormality determination flag is turned on. When the position of shift lever 264 is maintained at the M position as the reference position until predetermined time Tm elapses, HV-ECU 30 turns on a fail-safe permission flag.

Hereinafter, a control structure of a program executed by HV-ECU 30 of the shift switching device in accordance with the present embodiment will be described with reference to FIG. 15.

Figure 10:
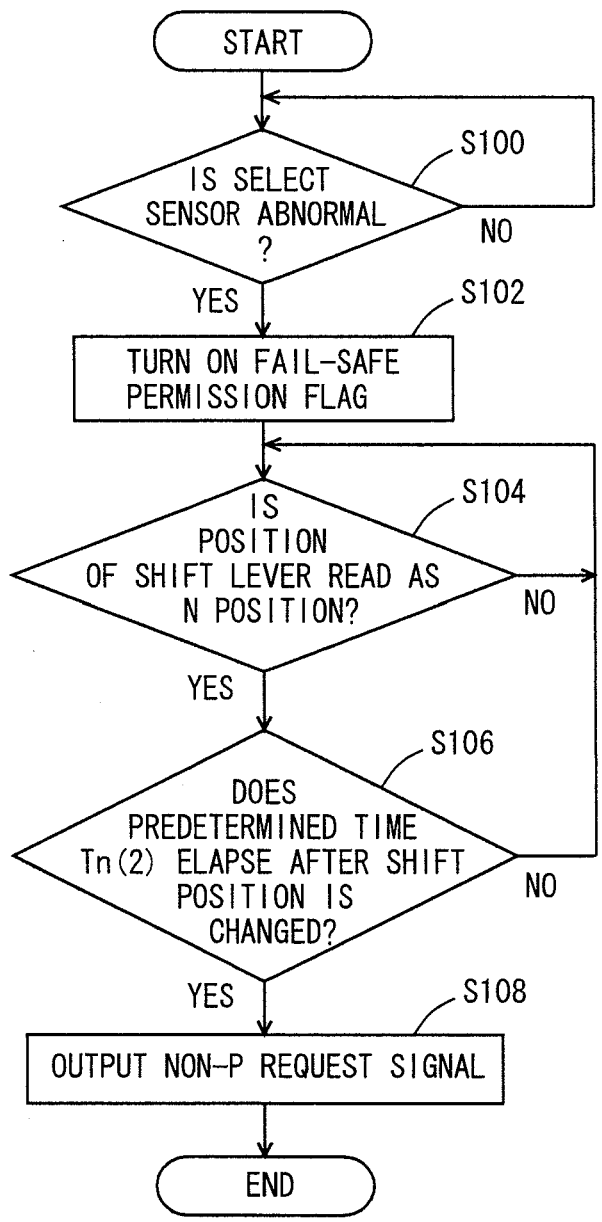
FIG. 10 is a flowchart showing a control structure of a program executed by the HV-ECU of the shift switching device in accordance with the first embodiment.
Figure 15:
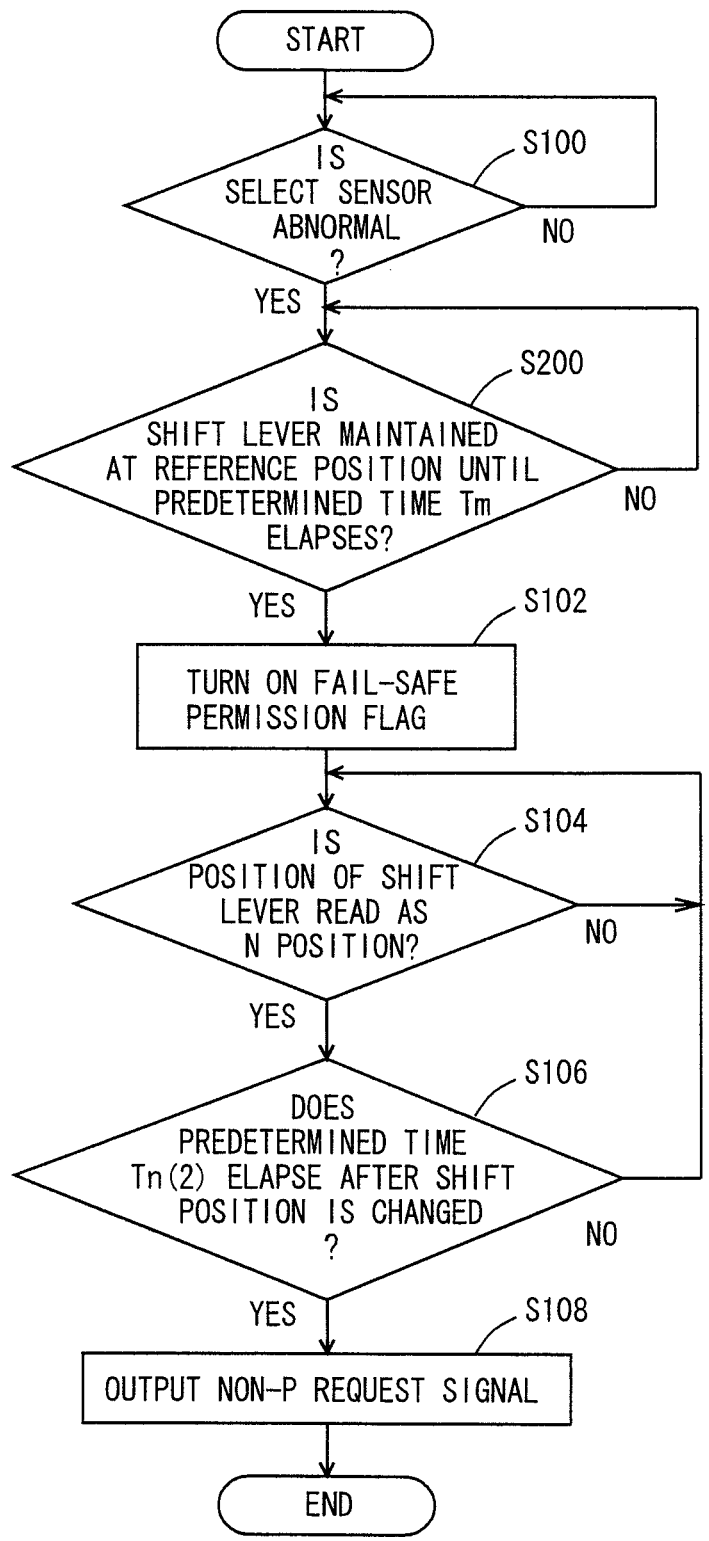
FIG. 15 is a flowchart showing a control structure of a program executed by an HV-ECU of a shift switching device in accordance with a second embodiment.

It is to be noted that the same step number is given to the same processing in the flowcharts of FIGS. 10 and 15, and what is processed in those steps is also the same. Therefore, detailed description thereof will not be repeated here.

If select sensor 22 is determined as abnormal (YES in S100), HV-ECU 30 determines in S200 whether or not shift lever 264 is maintained at the reference position until predetermined time Tm elapses. If shift lever 264 is maintained at the reference position until predetermined time Tm elapses (YES in S200), the processing proceeds to S102. Otherwise (NO in S200), the processing returns to S200.

Figure 16:
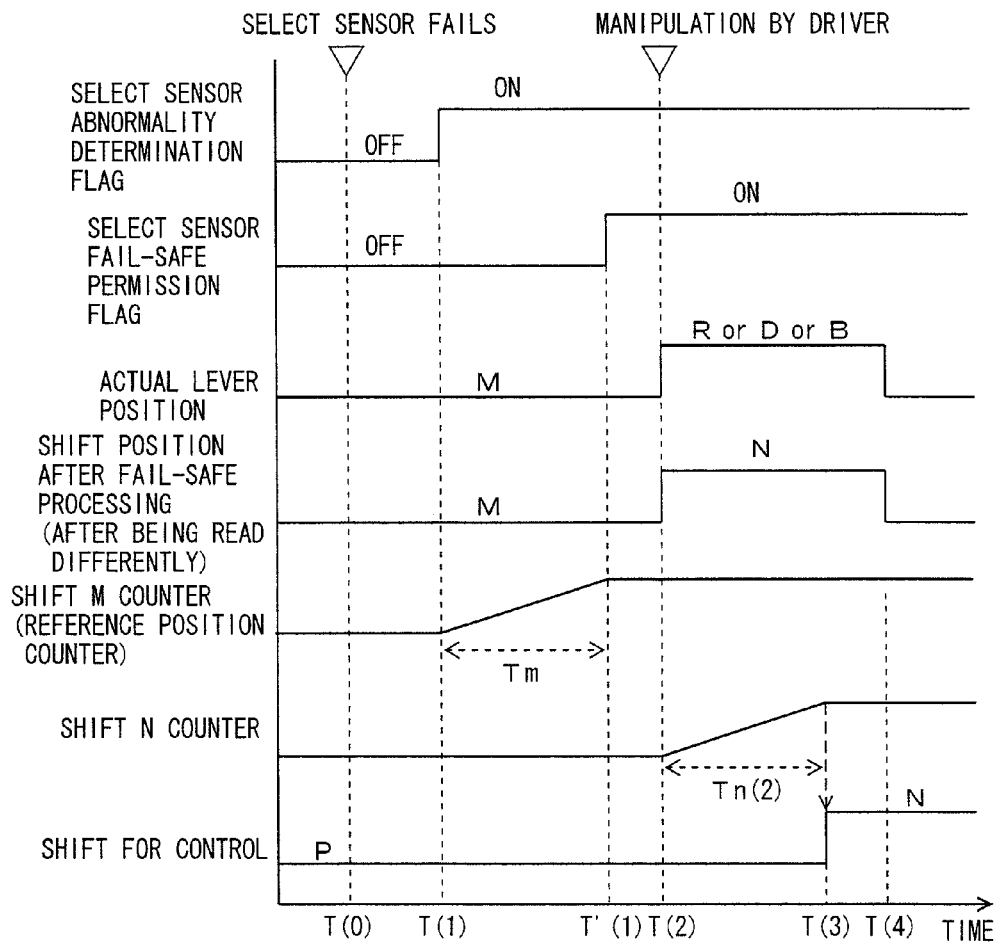
FIG. 16 is a timing chart showing operation of the HV-ECU of the shift switching device in accordance with the second embodiment.

Operation of HV-ECU 30 of the shift switching device in accordance with the present embodiment based on the structure and the flowchart as described above will be described with reference to FIG. 16.

When there occurs an abnormality in the detection result of select sensor 22 at time T(0), abnormality of select sensor 22 is determined at time T(1) (YES in S100), and a select sensor abnormality determination flag is turned on. It is determined whether or not the position of shift lever 264 is maintained at the M position until predetermined time Tm elapses from when the select sensor abnormality determination flag is turned on (S200).

Since it is determined at a time T'(1), which is a time point when predetermined time Tm elapses from time T(1), that the position of shift lever 264 is maintained at the M position until predetermined time Tm elapses (YES in S200), a fail-safe permission flag is turned on and fail-safe processing is performed (S102).

Figure 11:
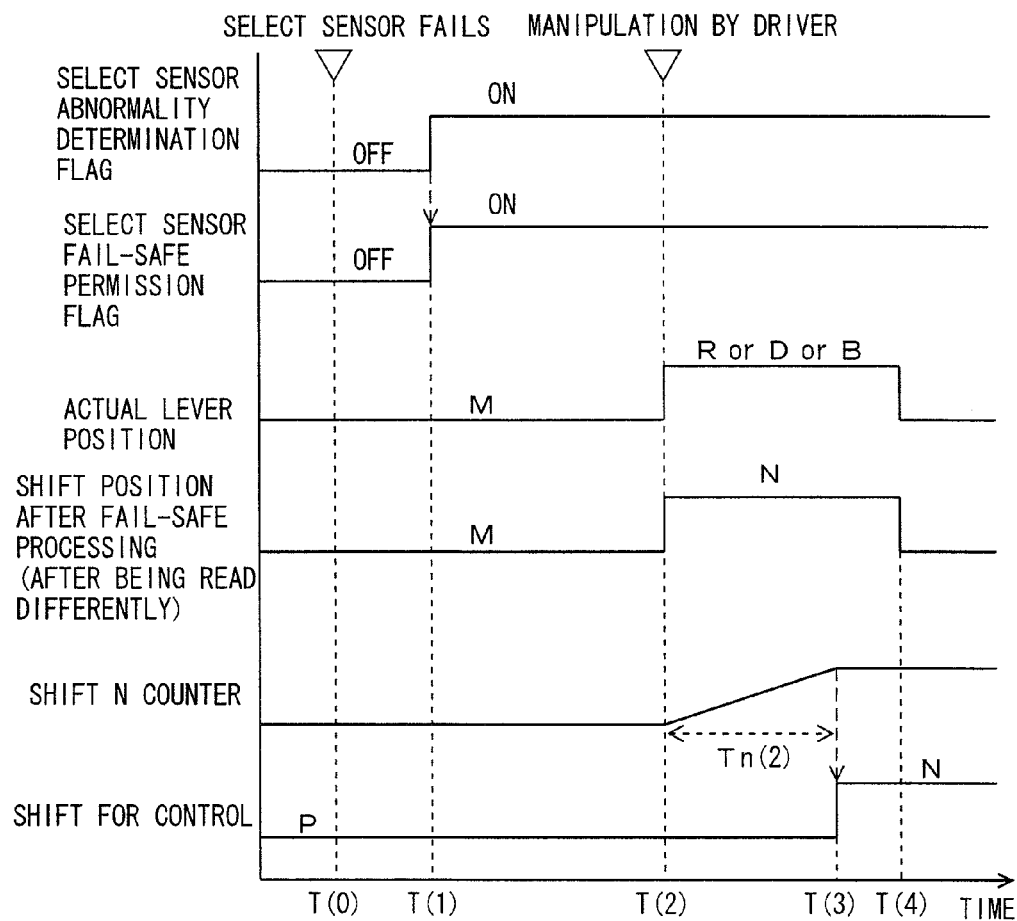
FIG. 11 is a timing chart showing operation of the HV-ECU of the shift switching device in accordance with the first embodiment.

It is to be noted that, since the operation of the shift switching device at times T(2) to T(4) and thereafter is the same as the operation of the shift switching device at times T(2) to T(4) and thereafter in the shift switching device described using FIG. 11, detailed description thereof will not repeated.

As has been described above, according to the shift switching device in accordance with the present embodiment, in a case where the position of the shift lever is maintained at the reference position until a predetermined time elapses after the selector sensor is determined as abnormal, such a case can be determined as not being in a state where the shift lever is erroneously manipulated (for example, a state where an object is hung on the lever). By changing the shift position corresponding to the position of the shift lever to a shift position releasing the parking position (for example, the neutral position) on this occasion, the shift position can be reliably switched to the neutral position by manipulating the shift lever. Thus, the parking lock can be released according to the intention of the driver. As a result, the vehicle can be moved by being pushed with hands or using a tow truck or the like. Therefore, a shift switching device that releases a parking lock according to the intention of a driver even in the event of an abnormality in a sensor during detection of the position of a shift lever can be provided.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

The invention claimed is:

1. A shift switching device comprising a first detection unit detecting a position of a shift lever in a first direction and a second detection unit detecting a position of said shift lever in a second direction, for switching a shift position of a transmission mounted in a vehicle based on the position in the first direction and the position in the second direction, wherein
said shift position includes at least a parking position and a shift position different from said parking position,
wherein said shift switching device further comprises a processing unit specifying a shift position based on detection results of said first detection unit and said second detection unit, and said processing unit determines whether or not said first detection unit is abnormal,
and in a case where said processing unit determines that said first detection unit is abnormal; and said shift switching device releases said parking position and if said shift lever is not manipulated in said second direction; maintains said parking position.

2. The shift switching device according to claim 1, wherein said shift lever is a momentary-type shift lever which automatically returns to a reference position when no manipulation force is applied, and
if said shift lever is maintained at a move destination position from said reference position until a predetermined time elapses, a shift position corresponding to said move destination position is determined.

* * * * *